G. W. & H. SIZER.
Car Wheel.
No. 5,076.  Patented Apr. 17, 1847
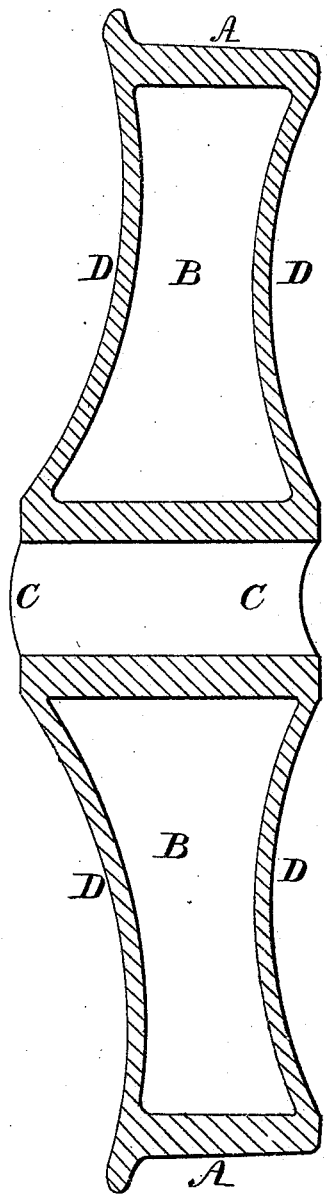

UNITED STATES PATENT OFFICE.

GEORGE W. SIZER AND HENRY SIZER, OF SPRINGFIELD, MASSACHUSETTS.

CAR-WHEEL.

Specification of Letters Patent No. 5,076, dated April 17, 1847.

*To all whom it may concern:*

Be it known that we, GEORGE W. SIZER and HENRY SIZER, of Springfield, in the county of Hampden and State of Massachusetts, have invented an Improvement in the Manner of Constructing Cast-Iron Wheels for Cars to be Used upon Railroads and for other Purposes; and we do hereby declare that the following is a full and exact description thereof.

The accompanying drawings show sections of the different combinations of plates in making wheels according to our plan.

The rim does not differ from those usually employed and are cast in chills in the ordinary manner. The rim is united to the hub of the wheel c, c, by the different plates as represented in the Figures 1, 2, 3 of the accompanying drawings.

Fig. 1.—The rim and hub are united by the combination of two plates D, D, each concave outwardly from the rim to the hub.

Figs. 2 and 3.—The rim and hub are united by the combination of two plates D and E one concave outwardly and the other straight from the rim to the hub which may be cast either solid or divided transversely as wheels heretofore made.

Figs. 2 and 3 are not claimed.

There has always existed a difficulty in manufacturing the different shaped plate wheels heretofore made on account of the contraction of the two plates toward each other in cooling thereby pressing upon the core between the plates, rendering it necessary to remove the core from the wheel while hot or endangering the standing of the wheel. It is a fact well known to iron founders that iron shrinks in cooling and if a wheel is made with two plates each convex outwardly or one convex outwardly and the other undulated or concave the plates as they cool straighten and contract the space between the plates and press upon the core. Whereas if the wheel is constructed with two plates each concave outwardly the straightening of the plates in cooling enlarges the space between the plates thus receding from the core of the wheel and rendering it unnecessary to remove the core of the wheel while hot as in other forms. In using one straight and one concave plate in combination the space is not enlarged as much; about one half. It operates on the same principle in cooling but in a less degree.

What we claim as our invention and desire to secure by Letters Patent, is—

The casting a car wheel of two plates of metal of the form herein set forth, united to the rim and hub:—the respective plates being concave outward curving from hub to rim;—the object of which form is to cause the plates to contract uniformly and to enlarge the space between the same at the weakest point as the metal cools, after casting, thereby enabling us to allow the core to remain in the wheel till it becomes perfectly cold. (The core remaining in the wheel, causes the same to cool slowly, having the effect to anneal and toughen the metal, as is well known to metallurgists.)

GEORGE W. SIZER.
HENRY SIZER.

Witnesses:
F. F. HOWLAND,
FREDERICK HUESTUS.